(12) United States Patent
He et al.

(10) Patent No.: US 12,035,418 B2
(45) Date of Patent: Jul. 9, 2024

(54) METHODS AND APPARATUS FOR SUPPORT OF REDUCED CAPABILITY DEVICES IN WIRELESS COMMUNICATION

(71) Applicant: Apple Inc., Cupertino, CA (US)

(72) Inventors: Hong He, Cupertino, CA (US); Dawei Zhang, Cupertino, CA (US); Wei Zeng, Cupertino, CA (US); Chunhai Yao, Cupertino, CA (US); Haitong Sun, Cupertino, CA (US); Yuchul Kim, Cupertino, CA (US); Yushu Zhang, Cupertino, CA (US); Chunxuan Ye, Cupertino, CA (US); Oghenekome Oteri, Cupertino, CA (US); Weidong Yang, Cupertino, CA (US); Yang Tang, Cupertino, CA (US); Jie Cui, Cupertino, CA (US); Zhibin Wu, Cupertino, CA (US); Pengkai Zhao, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/598,205

(22) PCT Filed: Feb. 2, 2020

(86) PCT No.: PCT/CN2020/074927
§ 371 (c)(1),
(2) Date: Sep. 24, 2021

(87) PCT Pub. No.: WO2021/159331
PCT Pub. Date: Aug. 19, 2021

(65) Prior Publication Data
US 2022/0377532 A1   Nov. 24, 2022

(51) Int. Cl.
*H04W 8/24* (2009.01)
*H04W 48/16* (2009.01)
*H04W 48/20* (2009.01)

(52) U.S. Cl.
CPC ............. *H04W 8/24* (2013.01); *H04W 48/16* (2013.01); *H04W 48/20* (2013.01)

(58) Field of Classification Search
CPC ....... H04W 8/24; H04W 48/16; H04W 48/20; H04W 88/02; H04W 48/12; H04W 48/18; H04W 48/10; H04L 5/16
See application file for complete search history.

(56) References Cited

U.S. PATENT DOCUMENTS

2011/0217980 A1   9/2011   Faurie et al.
2014/0198680 A1*  7/2014   Siomina ................... H04L 5/14
                                                            370/252
(Continued)

FOREIGN PATENT DOCUMENTS

WO   2011/107938 A1   9/2011
WO   2016/048044 A1   3/2016

OTHER PUBLICATIONS

Apple, "R17 enhancement for wearables", 3GPP TSG RAN Meeting #86, RP-192695, Dec. 9-12, 2019, 4 pages.
(Continued)

*Primary Examiner* — Kenneth T Lam
(74) *Attorney, Agent, or Firm* — Womble Bond Dickinson (US) LLP

(57) ABSTRACT

A method and apparatus for a wireless device of reduced capabilities to access a wireless communication network targeted to operate with wireless device having higher capabilities is disclosed. The device may receive from a base station of the wireless communication network an indication of whether the type of devices that includes the wireless device of reduced capabilities is allowed to access the
(Continued)

wireless communication network. The device may transmit to the base station signaling associated with connecting to the base station if the base station indicates that the type of devices with reduced capabilities is allowed to access the wireless communication network. The signaling allows the device to connect to the base station. The device may transmit capability information of the device to the base station. The device may configure its features based on the capability information to communicate with the base station.

20 Claims, 9 Drawing Sheets

(56) References Cited

U.S. PATENT DOCUMENTS

| | | | | |
|---|---|---|---|---|
| 2015/0327142 | A1* | 11/2015 | Martinez Tarradell | ..................... H04W 36/0061 455/436 |
| 2016/0165606 | A1* | 6/2016 | Rashid | ................... H04W 4/70 370/329 |
| 2016/0285915 | A1* | 9/2016 | Lidin | .................... H04W 12/08 |
| 2017/0013095 | A1* | 1/2017 | Blankenship | ..... H04W 74/0833 |
| 2018/0041857 | A1* | 2/2018 | Ouchi | ................... H04W 72/12 |
| 2021/0227451 | A1* | 7/2021 | Babaei | .................. H04W 48/10 |
| 2021/0392649 | A1* | 12/2021 | Kim | ..................... H04L 5/0053 |

OTHER PUBLICATIONS

Atcatel-Lucent, et al., "Capability signalling for Low Complexity MTC UE", 3GPP TSG-RAN WG2 Meeting #85, R2-140727, Feb. 10-14, 2014, 3 pages.
CATT, "Discussion on Low Cost MTC Impacts", 3GPP TSG RAN WG2 Meeting #85, R2-140072, Feb. 10-14, 2014, 4 pages.
Ericsson, "CR for Late drop capabilities ", 3GPP TSG-RAN2 Meeting #105, R2-1901556, Feb. 25-Mar. 1, 2018, 100 pages.
Ericsson, "New SID on support of reduced capability NR devices", 3GPP TSG RAN Meeting #86, RP-193238, Dec. 9-12, 2019, 5 pages.
Huawei, "Summary of informal email discussion for 'Physical layer aspects of random access transmission'", 3GPP TSG RAN WG1 Meeting #83, R1-157512, Nov. 15-22, 2015, 43 pages.
Intel Corporation, "Impacts on random access procedure for Release-13 low complexity UEs and enhanced coverage", 3GPP TSG-RAN WG2 Meeting #90, R2-152162, May 25-29, 2015, 6 pages.
International Preliminary Report on Patentability received for PCT Patent Application No. PCT/CN2020/074927, dated Aug. 25, 2022, 6 pages.
International Search Report and Written Opinion received for PCT Patent Application No. PCT/CN2020/074927, dated Nov. 17, 2020, 8 pages.
Spreadtrum Communications, "Discussion on Scheduling/HARQ/CSI Processing timeline on URLLC", 3GPP TSG RAN WG1 #96, R1-1902740, Feb. 25-Mar. 1, 2019, 10 pages.
Supplementary European Search Report and Search Opinion received for European Application No. 20919342.4, dated Jun. 7, 2023, 11 pages.
ZTE, "Discussions on power consumption reduction", 3GPP TSG RAN WG1 Meeting #80, R1-150141, Feb. 9-13, 2015, 3 pages.
Office Action received for Indian Patent Application No. 202217051395, dated Nov. 29, 2023, 6 pages.
Ericsson, "Subframe timing conflict in half-duplex Fdd", 3GPP TSG-RAN WG1 Meeting #77 R1-142374, May 19-23, 2014. 5 pages.
Ericsson, "Summary of email discussion on NR-Light", 3GPP TSG RAN Meeting #85 RP-192160, Sep. 16-19, 2019. 52 pages.
Office Action received for Chinese Patent Application No. 202080096253, dated Feb. 11, 2023, 16 pages (7 pages of English Translation and 9 pages of Original Document).
Office Action received for Japanese Patent Application No. 2022-547959, dated Aug. 28, 2023, 7 pages (4 pages of English Translation and 3 pages of Original Document).
The Secind Office Action received for Chinese Patent Application No. 202080096253.7, dated Oct. 29, 2023, 10 pages (6 pages of English Translation and 4 pages of Original Document).
Chinese Office Action received in related Chinese Application No. 202080096253.7, mailed Mar. 9, 2024, 13 pages.

* cited by examiner

UE 106 gNB 102

Cell not barred for NR-light UE

601 SystemInformationBlockType1 (NRLightAllowed-r17)

602 PRACH transmission (Selecting one from a predefined PRACH set O)

603 RAR

604 RRC Connection Request (Using MAC LCID set to a predefined dedicated value)

gNB identify the UE as NR-light device

605 UE Capability Enquiry

606 UE capability Information (indicate NR-light type of UE)

FIG. 6

FIG. 7 Tx and Rx switching with Guard Period for Half-Duplex FDD UEs

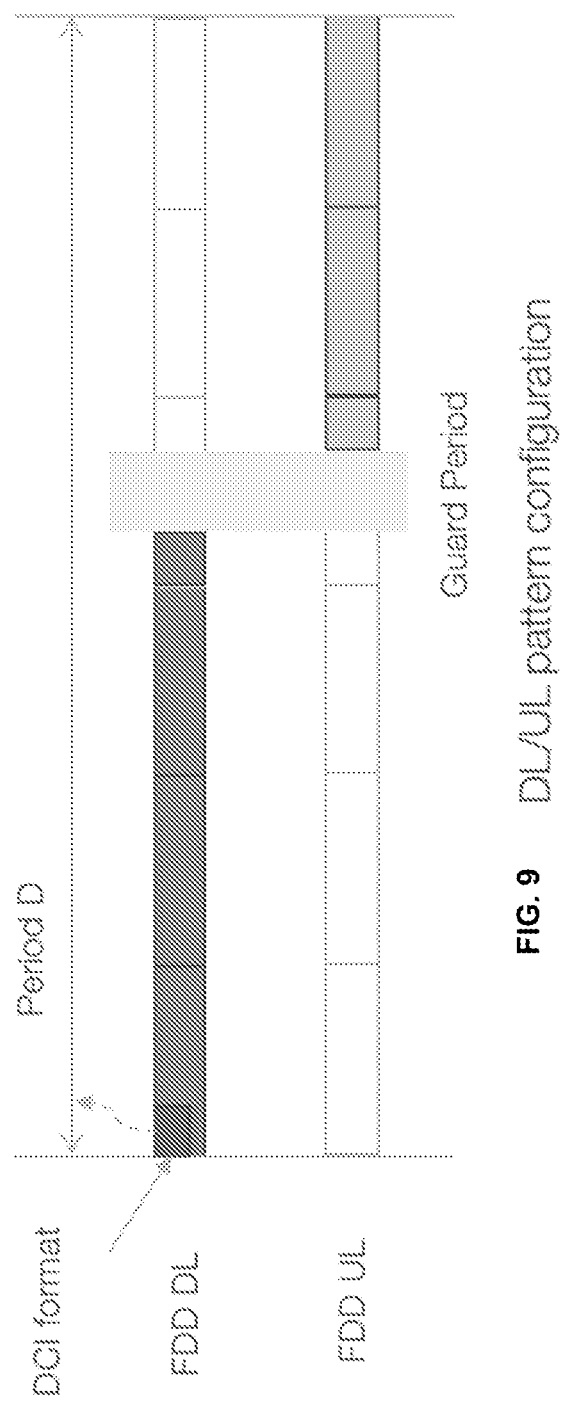
FIG. 9  DL/UL pattern configuration

METHODS AND APPARATUS FOR SUPPORT OF REDUCED CAPABILITY DEVICES IN WIRELESS COMMUNICATION

RELATED APPLICATIONS

The present application is the national phase of International Application No. PCT/CN2020/074927, filed on Feb. 12, 2020 and the disclosure of which is hereby incorporated herein by reference in its entirety.

FIELD

This disclosure relates to the field of wireless communication, and more specifically, to methods and apparatus that enable wireless communication devices with reduced capability to operate in a communication network intended to support devices with higher capability. Other aspects are also described.

BACKGROUND

Newer generation of wireless communication networks such as the 5G new radio (NR) systems are designed to support the high throughput and low latency requirements of increasingly capable wireless devices. For example, 5G NR systems are targeted to support the enhanced mobile broadband (eMBB), Ultra-Reliable and Low Latency Communication (URLLC), and Time-Sensitive Networking (TSN) services enabled by wireless devices with enhanced functionality. However, devices with reduced capability such as sensors (e.g., pressure sensors, thermometers, motion sensors, surveillance cameras) used for Internet of Things (IoT) applications or wearable devices (e.g., smart watches, rings, medical monitoring devices) may coexist on the networks. Features and configurations that allow the wireless devices with reduced capability to efficiently access and utilize the networks resources may prolong the battery life of the wireless devices. The networks may also help to mitigate performance degradation due to the reduced capability of these devices.

SUMMARY

A wireless device with reduced capability may be configured to operate in a wireless communication network targeted to support wireless devices with higher capability. When connecting to the communication network, the wireless device may identify itself to the communication network as a type of devices with reduced capability using a subset of synchronization and connection resources predefined for the type. To allow the communication network to allocate network resources that are tailored to the reduced capability of the wireless device, the communication network may inquire about and, in response, the wireless device may communicate information on its capability to the communication network. Data throughput, synchronization signaling, and transmission resources may be configured to reduce the processing and hardware requirements of the wireless device. When the data throughput exceeds the processing capability of the wireless device or when there is a collision between transmission and reception in half-duplex operation, the wireless device may activate features to handle the scenarios.

A method for a wireless device of reduced capability to access, connect, synchronize, and communicate with a wireless communication network targeted to operate with wireless devices having higher capability is disclosed. The method includes the device receiving from a base station of the wireless communication network an indication of whether a type of devices that includes the reduced-capability wireless device is allowed to access the wireless communication network via the base station. The method includes transmitting by the wireless device to the base station signaling associated with connecting to the base station that indicate the type of reduced-capability devices to which the wireless device belongs if this type is indicated as being allowed to access the wireless communication network. The method also includes the device transmitting information on the capability of the device to the base station in response to an inquiry from the base station. The capability information may include information on synchronization monitoring, processing latency, modulation schemes, configuration of half-duplex mode, and other operating parameters to assist the base station in configuring resources and operating modes for the wireless device.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

FIG. 6 is a signal flow diagram of a method for a UE with reduced capability to access a communication network according to some embodiments of the disclosure.

FIG. 9 illustrates DL/UL slot pattern configuration in accordance to some embodiments of the disclosure.

DETAILED DESCRIPTION

Figure 1:
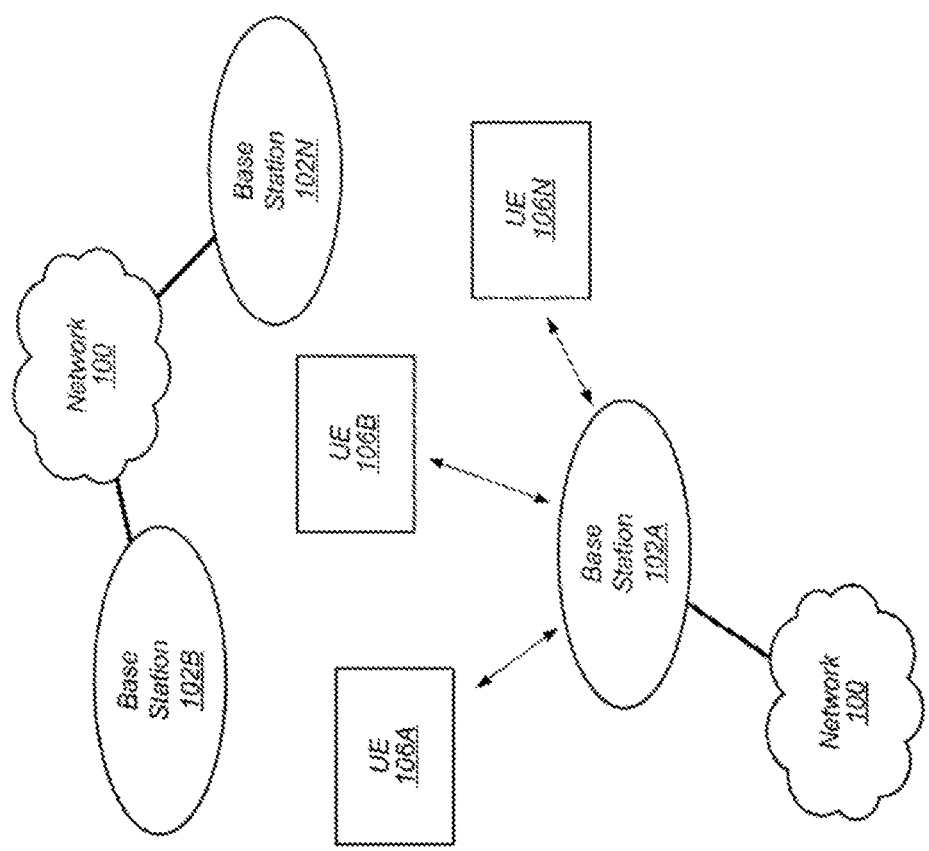
FIG. 1 illustrates an example wireless communication system according to some embodiments of the disclosure.

It is desirable for a wireless device with reduced capability to be able to efficiently access and utilize the resources of a wireless communication network. Newer generation of wireless communication networks such as the 5G NR systems are targeted to support wireless communication devices that have high throughput and low latency requirements such as smartphones running video-streaming applications. Devices with reduced capability such as sensors in IoT applications or wearable devices may coexist on the network. Support of these devices with reduced capability using resources and operating modes that are intended for higher capability devices may increase overhead and decrease the operational efficiency of the networks. The performance of the wireless devices with reduced capability may also be degraded such as a shortened battery life when the devices are unable to successfully receive and transmit data when the data throughput or the operating modes exceeds the processing capability of the wireless device.

To allow the wireless device with reduced capability to efficiently utilize the resources of the communication network, the wireless device may enable features and configurations for synchronization monitoring, processing latency, modulation schemes, configuration of half-duplex mode, and other operating parameters that are less stringent than those for devices with higher capability. The wireless device may communicate its capability and configuration information to the networks to allow the networks to configure the network resource to match with the capability of the wireless device. In some embodiments, the wireless devices may reduce the amount of hardware resources such as buffers used for decoding and storing operating parameters or search space used for synchronization monitoring. For example, in 5G networks, to reduce power consumption and increase battery life, the wireless devices may reduce the processing time for monitoring PDCCH (physical downlink control channel) by performing a smaller number of blind decodes and CCE (control channel elements).

In some embodiments, to reduce processing time, the wireless device may support a reduced set of modulation schemes. In some embodiments, the wireless device may configure and report its processing time capability to the base station for a supported range of data rates. In some embodiments, the wireless devices may be configured to operate in half-duplex FDD (frequency division duplex) mode without simultaneous transmission and reception. Due to the reduced capability of the wireless device, the delay in switching between the transmit and receive frequencies in the half-duplex FDD operation may be longer. The wireless device may configure and report a number of guard periods between transmit and receive cycles to accommodate the longer frequency switching delay. In some embodiments, if there is a conflict in scheduling between transmit and receive cycles, the wireless device may prioritize the various synchronization signaling, control signaling, and data communication in the transmit and receive cycles.

In the following description, numerous specific details are set forth. However, it is understood that aspects of the disclosure here may be practiced without these specific details. In other instances, well-known circuits, structures and techniques have not been shown in detail in order not to obscure the understanding of this description.

The terminology used herein is for the purpose of describing particular aspects only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and "comprising" specify the presence of stated features, steps, operations, elements, or components, but do not preclude the presence or addition of one or more other features, steps, operations, elements, components, or groups thereof.

The terms "or" and "and/or" as used herein are to be interpreted as inclusive or meaning any one or any combination. Therefore, "A, B or C" or "A, B and/or C" mean any of the following: A; B; C; A and B; A and C; B and C; A, B and C." An exception to this definition will occur only when a combination of elements, functions, steps or acts are in some way inherently mutually exclusive.

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
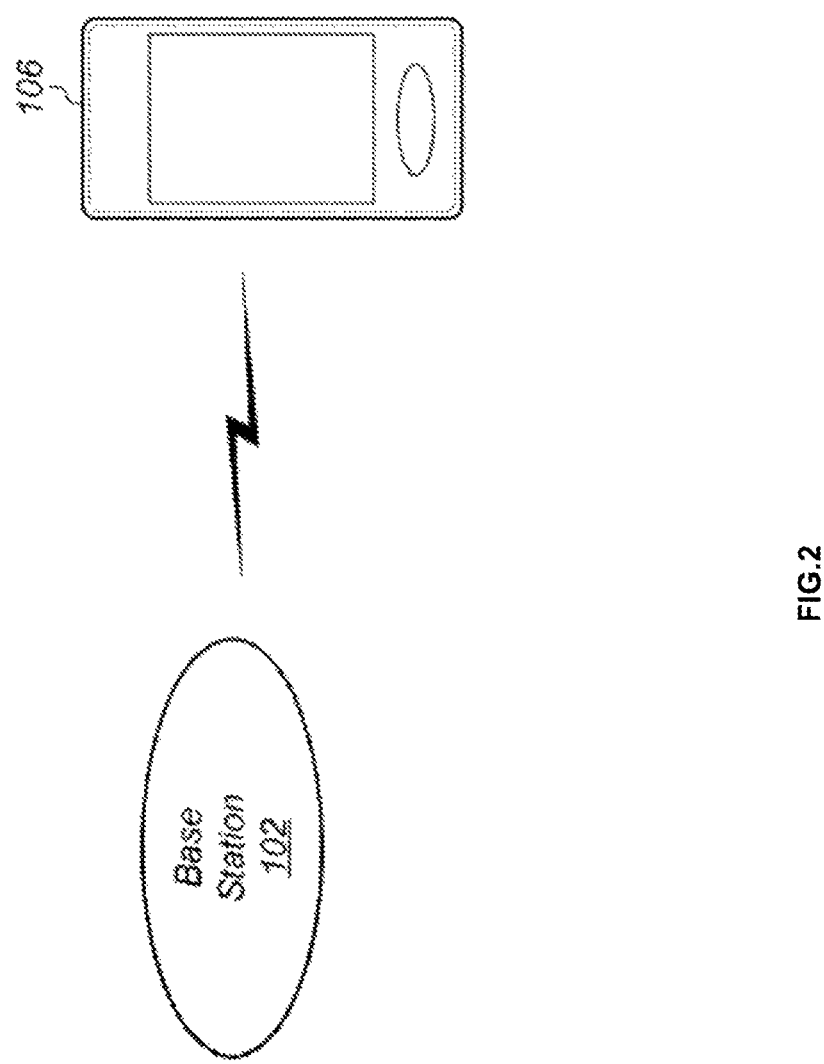
FIG. 2 illustrates a base station (BS) in communication with a user equipment (UE) device according to some embodiments of the disclosure.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTTor LTE or GSM), and separate radios for communicating using each of Wi-Fi and Bluetooth. Other configurations are also possible.

Figure 3:
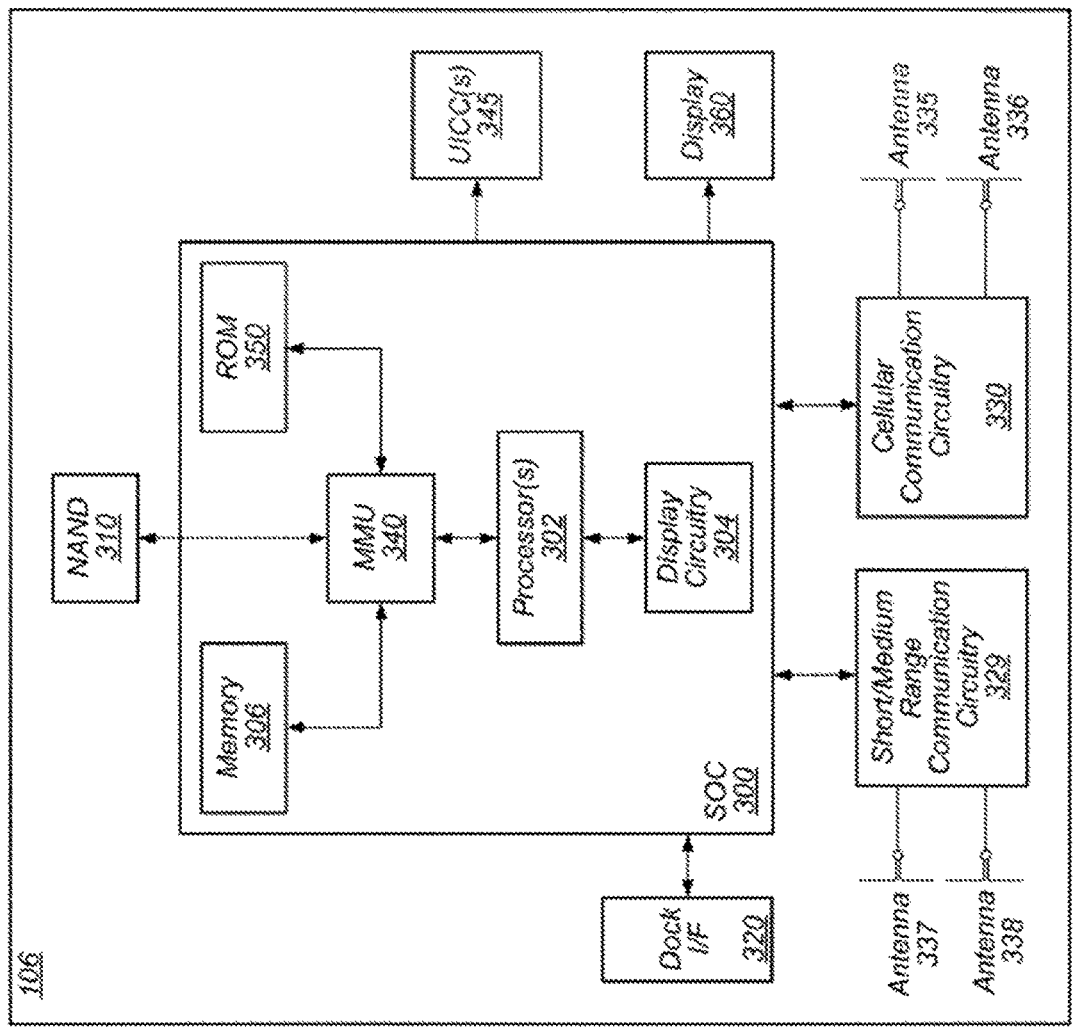
FIG. 3 illustrates an example block diagram of a UE accordance to some embodiments of the disclosure.

FIG. 3 illustrates an example simplified block diagram of a communication device 106, according to some embodiments. It is noted that the block diagram of the communication device of FIG. 3 is only one example of a possible communication device. According to some embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be a type of devices with reduced capability than devices that are targeted by the network 100. The communication device 106 may be configured to transmit a request to connect to a network node of the network 100 using resources reserved for the type of reduced-capability devices to which the communication device 106 belongs. The communication device 106 may thus identify and differentiate itself as a reduced-capability device from other types of devices. In one embodiments, the communication device 106 may report information about its capability and configuration information to the network node to allow the network 100 to configure the network resources to match the reduced capability of the communication device 106.

As described herein, the communication device 106 may include hardware and software components for implementing the above features to operate with the network 100 targeted to work with other types of devices that may have more capabilities. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
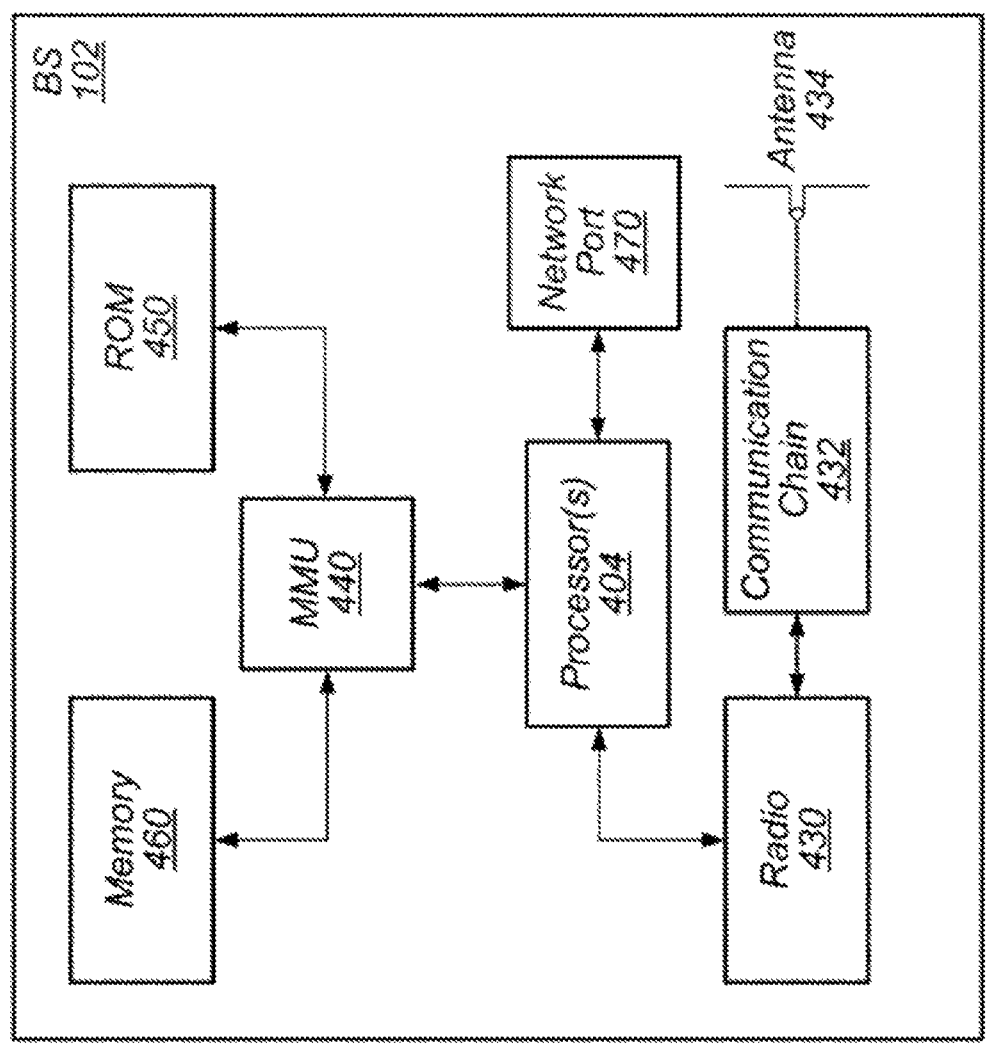
FIG. 4 illustrates an example block diagram of a BS in accordance to some embodiments of the disclosure.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.). As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
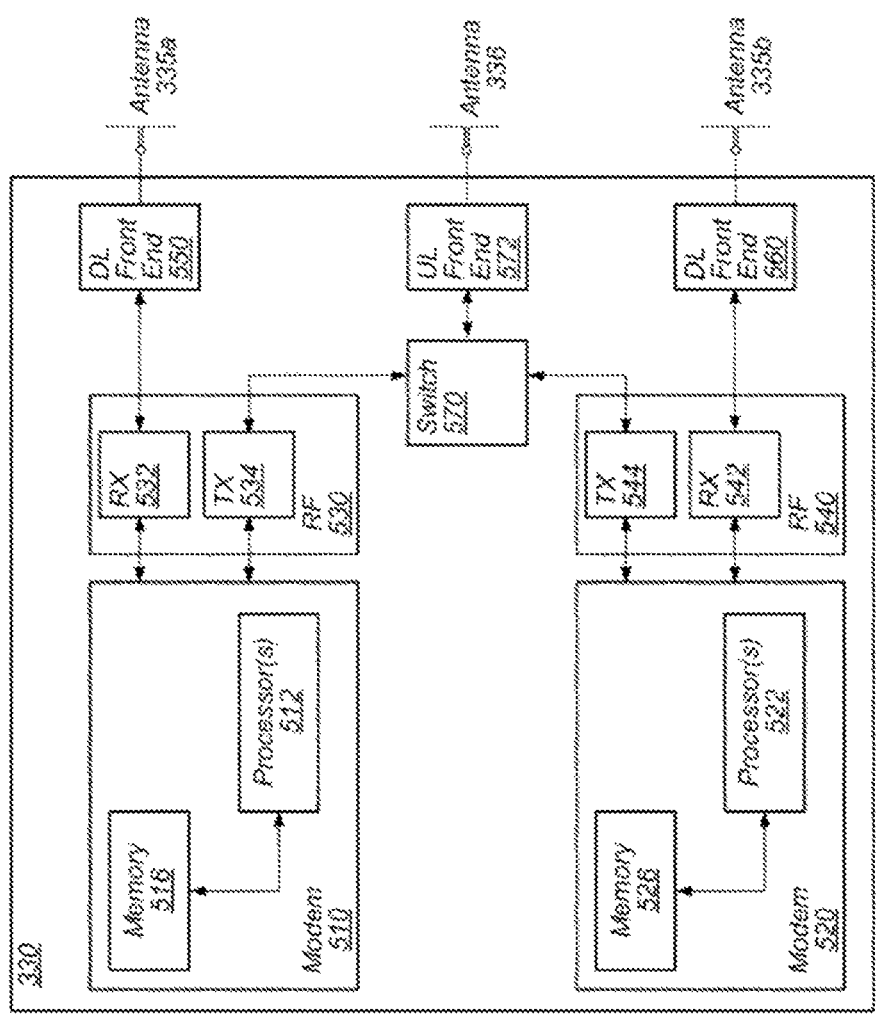
FIG. 5 illustrates an example block diagram of cellular communication circuitry accordance to some embodiments of the disclosure.

FIG. 5 illustrates an example simplified block diagram of cellular communication circuitry, according to some embodiments. It is noted that the block diagram of the cellular communication circuitry of FIG. 5 is only one example of a possible cellular communication circuit. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the RAT (e.g., as supported via modem 510), switch 570 may be switched to a state that allows modem 510 to transmit signals according to the RAT (e.g., via a transmit chain that includes transmit circuitry 534 and UL front end 572).

As described herein, the modem 510 may include hardware and software components for implementing the above features for a communication device to operate with a network targeted to work with other types of devices that may have more capabilities, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for a communication device to operate with a network targeted to work with other types of devices that may have more capabilities, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

FIG. 6 is a signal flow diagram of a method for a UE with reduced capability to access and connect to a wireless communication network in accordance to some embodiments of the disclosure. The UE 106 with reduced capability may be referred to as NR-light UE. A gNB 102 may control access to the network by various UEs. To allow the communication network to define and restrict the types of devices that may access the network, gNB 102 may transmit an indication of whether the type of devices that includes the NR-light UE is allowed access to the communication network in operation 601. In some embodiments, an information element (IE), e.g., NRLightAllowed, may be included in a system block message, e.g., System Information Block 1 (SIB1), through either broadcast message or dedicated signaling, to indicate whether or not NR-light UEs are allowed to access the network through gNB 102. If NRLightAllowed IE is not included in SIB1, UE 106 may consider the network as barred to NR-light UEs.

If NRLightAllowed IE is included in SIB1, the network is accessible to NR-light UEs. To allow UE 106 to identify itself as a NR-light UE to gNB 102, UE 106 may access the network using signaling protocol of a random access channel reserved for NR-light UEs. In some embodiments, the available set of PRACH (physical random access channel) resources for a device to gain access to the network may be partitioned into two or three groups (e.g., group A/B/C). In some embodiments, one of these PRACH groups, e.g., group C, is dedicated for NR-light UEs for the random access procedure. In some embodiments, there may be more than one type of NR-light UEs and a PRACH group may be reserved for each one of the multiple types of NR-light UEs. In operation 602, UE 106 may transmit a request to gNB 102 to access the network using PRACH resources reserved for the type of NR-light UEs to which UE 106 belongs. UE 106 may thus use the PRACH transmission to identify and differentiate itself as an NR-light UE from other types of UEs.

In operation 603, gNB receives the PRACH transmission and transmits a RAR (random access response) to UE 106. In some embodiments, instead of using the PRACH transmission to identify itself as an NR-light UE to gNB 102, UE 106 may use the RRC (radio resource control) protocol to identify itself when it attempts to establish a radio connection to gNB 102. UE 106 may connect to the network using signaling protocol of common control channel (CCCH) resources reserved for NR-light UEs. In some embodiments, the CCCH resources reserved for the NR-light UEs to connect to the network may be indicated by the LCID (logical channel ID) in the header of a MAC (media access control) data unit. In some embodiments, NR-light UEs may indicate CCCH using a unique LCID, e.g. a NR-Light UE may indicate CCCH using LCID '01011'; otherwise the UE may indicate CCCH using LCID '00000.' In some embodiments, there may be more than one type of NR-light UEs and a LCID may be reserved to indicate the CCDH for each one of the multiple types of NR-light UEs. In operation 604, UE 106 may transmit an RRC connection request to gNB 102 to connect to the network using the MAC LCID reserved for the type of NR-light UEs to which UE 106 belongs. gNB 102 may identify UE 106 as an NR-light UE.

In some embodiments, instead of or in addition to UE 106 using the PRACH transmission or the RRC connection request to identify itself as an NR-light UE to gNB 102, the gNB 102 may inquire about the capability of UE 106. For example, in operation 606, gNB 102 may signal to UE 106 to provide information about the capability of UE 106. In response, UE 106 to transmit information about its capability to gNB 102. For example, UE 106 may indicate that it's an NR-light UE or may transmit information on its synchronization monitoring resources, processing latency, modulation schemes, half-duplex FDD configuration, and other operating parameters to eNB 102.

In some embodiments, the capability information of UE 106 reported to eNB 102 may include a maximum transport block size (TBS) associated with RNTI (radio network temporary identifier) used by eNB 102 to allocate UE 106 with UL grants and DL assignments. For example, a maximum TBS X associated with C-RNTI (cell-RNTI), MCS-RNTI (modulation coding scheme-RNTI), CS-RNTI (configured scheduling-RNTI), or SPS-C-RNTI (semi-persistent scheduling-cell-RNTI)) within a TTI (transmission time interval) may be reported as part of UE capability signaling. As an example, the maximum TBS X may be 1,000 bits. In some embodiments, the maximum TBS X associated with an NR-light UE may be determined for UE 106 once gNB 102 identifies UE 106 as an NR-light UE.

In some embodiments, the capability information of UE 106 reported to eNB 102 may include a maximum TBS Y transmitted on PDSCH (physical downlink shared channel) associated with a broadcast message containing system information monitored by PDCCH CRC (cyclic redundancy check) scrambled with SI-RNTI (system information-RNTI), paging and system information change notification message associated with PDCCH CRC scrambled with P-RNTI (paging-RNTI), or random access response (RAR) identified by PDCCH CRC scrambled with RA-RNTI (random access-RNTI). In some embodiments, the maximum TBS Y associated with an NR-light UE may be determined for UE 106 once gNB 102 identifies UE 106 as an NR-light UE. In some embodiments, X<Y. By specifying the maximum TBS X or Y, the buffers used store the control message for UL grants and DL assignments, broadcast messages, paging and system information change notification messages, or RAR may be reduced. This may bring additional cost and power saving due to the reduced buffers.

The gNB 102 may schedule downlink transmissions on PDSCH in accordance with the processing capability of UE 106 reported as part of UE capability signaling or associated with an NR-light UE. In some embodiments, if UE 106 is scheduled with PDSCH transmissions that exceed its processing capability as either associated with an NR-light UE or reported as part of UE capability signaling, different options may be considered to handle this scenario. In some embodiments, UE 106 may prioritize between the PDSCH transmissions. In some embodiments, on FR1 (frequency range 1) cell, the UE may skip decoding the scheduled PDSCH with C-RNTI/MCS-RNTI/CS-RNTI/SPS-C-RNTI if the PDSCH is scheduled during a process of P-RNTI triggered SI (system information) acquisition or during a process of autonomous SI acquisition. In some embodiments, due to the larger bandwidth available on FR2 (frequency range 2) cell, the UE may skip decoding the scheduled PDSCH scheduled with C-RNTI/MCS-RNTI/CS-RNTI/SPS-C-RNTI if the PDSCH is scheduled during a process of autonomous SI acquisition or if it exceeds a TB size threshold. In some embodiments, the TB size threshold may be associated with an NR-light UE or may be reported as part of UE capability signaling.

In some embodiments, the capability information of UE 106 reported to eNB 102 may include features and configuration information that allows UE 106 to relax processing time. In some embodiments, to relax UE processing time, NR-light UEs may support a reduced set of modulation and coding schemes for UL, DL or both. As one example, NR-light UEs may only support QPSK and 16QAM for UL transmission while DL transmission may support higher modulation modes because the processing time for UL transmission may increase significantly for higher modulation modes while the processing time for DL receive may not increase much for the higher modulation modes. In some embodiments, the supported modulation schemes may be reported as part of UE capability signaling.

In some embodiments, a new set of processing time e.g., capability 0, for PDSCH decoding and PUSCH (physical uplink shared channel) preparation may be introduced specially for NR-light UEs for each supported numerology or SCS (Subcarrier Spacing), as SCS may determine the slot duration and correspondingly the peak data rate. The processing time may be relaxed compared to the processing time specified for UEs defined in the previous NR releases as having the lowest capability, e.g., capability 1. In some embodiments, the UE CSI (channel status information) computation time may be also increased compared to values that are previously defined for other types of UEs. In some embodiments, the new set of processing time may be reported as part of UE capability signaling.

In some embodiments, to relax processing time, NR-light UEs may be associated with a set of supported SCS-dependent K1 values and K2 values used to assist the corresponding configuration of gNB 102. K1 may indicate the time gap in slots at gNB 102 between PDSCH transmission and the reception of the PUCCH (physical uplink control channel) that carries ACK/NACK for the PDSCH. K2 may indicate the time gap in slots at gNB 102 between PDCCH transmission and the PUSCH reception. By relaxing the K1 and K2 values, NR-light UEs may have more time to generate ACK/NACK after receiving PDSCH and more time to generate data for UL transmission in PUSCH after receiving PDCCH and hence slowing down the clock rate and reducing the power consumption. In some embodiments, the SCS-depending K1 and K2 values may be reported as part of UE capability signaling.

In some embodiments, to relax processing time, UE 106 may report a reduced number of BD (blind decoding) in the UE USS (specific search space), a reduced number of CCEs, or both for PDCCH monitoring. For example, UE 106 may report a value X and the number of BD supported by UE 106 in a single slot is X*Y where Y is specified as the value for UEs previously defined as having the lowest capability, e.g., capability 1. In some embodiments, $X \in (¼, ½)$. In some embodiments, the reduced number of BD or the reduced number of CCEs may be associated with an NR-light UE identified by gNB 102.

In some embodiments, to relax processing time or reduce complexity, NR-light UEs may be associated with a reduced number of HARQ (hybrid automatic repeat request) processes. In some embodiments, the reduced number of HARQ may be reported as part of UE capability signaling. This may bring additional cost and power saving due to the reduced HARQ soft bits buffer.

In some embodiments, the capability information of UE 106 reported to eNB 102 may include configurations to support half-duplex FDD operation. In some embodiments, a variety of configurations for the Rx-to-Tx GP (Guard Period) and Tx-To-Rx GP may be created. The GP value maybe reported as part of UE capability signaling to provide important flexibility for UE implementation or may be associated with an NR-light UE identified by gNB 102.

Figure 7:
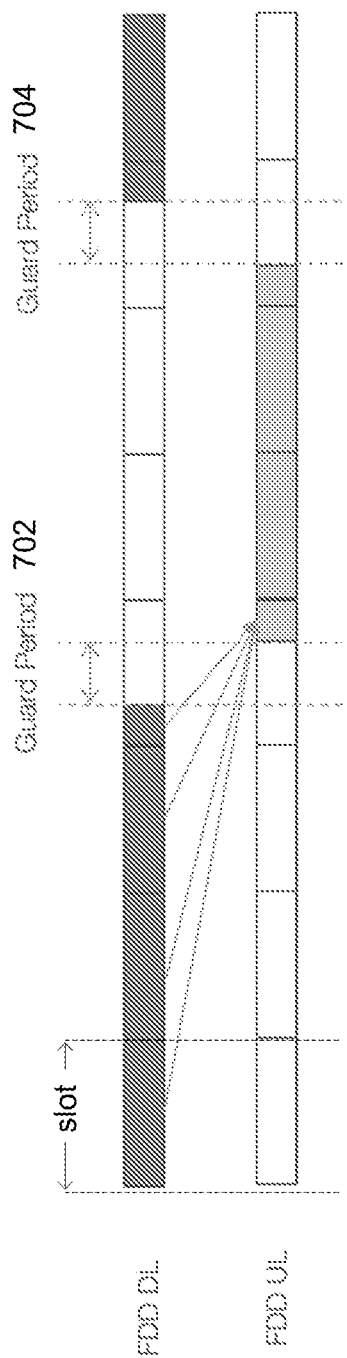
FIG. 7 illustrates Tx and Rx switching with guard period for a UE operating in half-duplex FDD in accordance to some embodiments of the disclosure.

FIG. 7 illustrates Tx and Rx switching with guard period for a NR-light UE operating in half-duplex FDD in accordance to some embodiments of the disclosure. The consideration is that the NR-light UE may implement one oscillator, instead of two oscillators, for HD-FDD and because its PLL has to re-lock to the DL frequency after transmitting on the UL frequency or re-lock to the UL frequency after receiving on the DL frequency, the NR-light UE may need extra time when switching between FDD DL and FDD UL.

In some embodiments, as shown in FIG. 7, Rx-to-Tx GP 702 and Tx-to-Rx GP 704 are configured by the UE to have a resolution of symbols so as not to receive the last part (e.g., symbols) of a downlink slot immediately preceding an UL slot with UL transmission scheduling or not to receive the first part (e.g., symbols) of a DL slot after the UL transmission, respectively. In some embodiments, Rx-to-Tx GP 702 and Tx-to-Rx 704 may be configured by broadcast message from gNB 102 and applied to all the HD-FDD UEs or NR-light UEs to simplify the HD operation. Alternatively, Rx-to-Tx GP 702 and Tx-to-Rx 704 may be configured on a per UE basis based on at least the UE location (e.g. distance to the gNB) and reported as part of the UE capability signaling.

In some embodiments, as shown in FIG. 7, Rx-to-Tx GP 702 and Tx-to-Rx GP 704 are configured by the UE to have a resolution of symbols so as not to receive the last part (e.g., symbols) of a downlink slot immediately preceding an UL slot with UL transmission scheduling or not to receive the first part (e.g., symbols) of a DL slot after the UL transmission, respectively. In some embodiments, Rx-to-Tx GP 702 and Tx-to-Rx GP 704 may be configured by broadcast message from gNB 102 and applied to all the HD-FDD UEs or NR-light UEs to simplify the HD operation. Alternatively, Rx-to-Tx GP 702 and Tx-to-Rx GP 704 may be configured on a per UE basis based on at least the UE location (e.g. distance to the gNB) and reported as part of the UE capability signaling.

Figure 8:
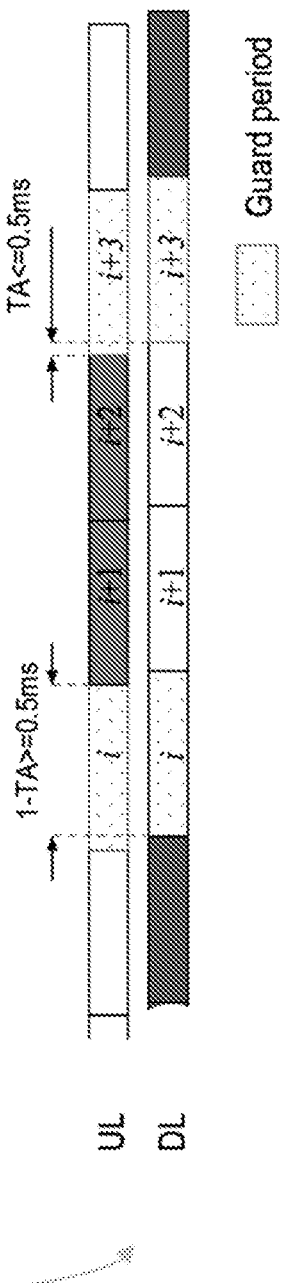
FIG. 8 illustrates Tx and Rx switching with guard period for a UE operating in half-duplex FDD using TA-based guard period configuration in accordance to some embodiments of the disclosure.

FIG. 8 illustrates Tx and Rx switching with GP for a UE operating in half-duplex FDD using TA-based (timing advance-based) GP configuration in accordance to some embodiments of the disclosure. In some embodiments, a table of GP configurations identified by index numbers may be defined as shown in FIG. 8. UE may be configured with proper GP configuration based on corresponding TA value that is associated with distance between UE and gNB.

GP configuration for index 0 has a resolution of symbols so as not to receive the last one or more symbols of a downlink slot immediately preceding an UL slot with PUSCH or not to receive the first one or more symbols of a DL slot after the UL transmission, similar to the GP configuration for FIG. 7. The slots for DL-to UL and UL-to-DL for index 0 show that an entire slot is not configured for the Rx-to-Tx GP or the Tx-to-Rx GP.

GP configuration for index 2 shows a Rx-to-Tx GP of one slot by not receiving a DL slot immediately preceding an UL slot and a Tx-to-Rx GP of one slot by not receiving a slot immediately following an UL transmission slot. FIG. 8 shows that when TA<=0.5 ms and 1-TA>=0.5 ms, GP configuration for index 2 may provide sufficient time for DL-to-UL and UL-to-DL FDD switching. However, when 0.5 ms<TA<0.667 ms and 1-TA<0.5 ms, the TA value may be sufficient for the switching from UL to DL but 1-TA may not be sufficient from DL to UL switching. Hence, GP configuration index 1 maybe configured for this scenario.

In GP configuration for index 1, to provide additional time for DL-to-UL switching, a Rx-to-Tx GP of two slots is configured by not receiving for two DL slots immediately preceding an UL transmission slot. The Tx-to-Rx GP may be less than one slot as in GP configuration for index 0 by not receiving the first one or more symbols of a DL slot after the UL transmission because the TA value is sufficient for the switching from UL to DL.

In some embodiments, the table of configuration information may be configured by broadcast message from gNB 102 and applied to all the HD-FDD UEs or NR-light UEs to simplify the HD operation. The gNB 102 may measure the TA to UE 106 and may transmit the measured TA to UE 106 for UE 106 to select the GP configuration from the table based on the measured TA. In some embodiments, the oscillator numbers (i.e. 1 vs. 2) of UE 106 may be explicitly reported as part of UE capability signaling or implicitly associated with GP values that are reported.

Because the NR-light UE operates on HD-FDD, the device is unable to transmit and receive simultaneously. If there is a scheduling conflict between an UL transmission and a DL assignment, the NR-light UE may implement remedial measures. In some embodiments, if the NR-light UE is not expected to have a scheduling conflict on DL or UL direction, each NR-light UE may determine how it handles the unexpected conflict when it occurs.

In some embodiments, the NR-light UE may define a list of priority for UL transmissions and DL receptions. In some embodiments, synchronization signal and control signal may have priority over data packets when collision occurs. For example, the NR-light UE may prioritize PRACH in UL as the highest priority, followed by reception of SSB (synchronization signal block) such as PBCH (physical broadcast channel) and PSS/SSS (primary synchronization signal/secondary synchronization channel) in DL, followed by HARQ-ACK in response to DL transmission, followed by SR (scheduling request) or periodic CSI in UL, followed by reception of PDSCH or CSI-RS (channel state information reference signal) in DL, followed by SRS (sounding reference signal) transmission in UL, followed by unicast DL assignment or UL transmission.

FIG. 9 illustrates a DL/UL slot pattern configuration in accordance to some embodiments of the disclosure to handle collisions between an UL transmission and a DL assignment. In some embodiments, the NR-light UE may be configured with a slot configuration period of P by UE-dedicated RRC signaling. A number of DL slots and a number of UL slots may be configured by the UE-dedicated RRC signaling. In some embodiments, the NR-light UE may be indicated by DCI (downlink control information) format a set of slots format combinations staring from the slot where UE detects the DCI format. The periodic DL signals, (e.g., Periodic CSI-RS, PDCCHs), may be guaranteed to coincide with DL slots and the period UL transmission, e.g., SRS, may be assumed to coincide with the UL slots, which are either configured by RRC or dynamically indicated by DCI format.

Embodiments of the method and apparatus described herein for supporting reduced capability devices in a wireless network may be implemented in a data processing system, for example, by a network computer, network server, tablet computer, smartphone, laptop computer, desktop computer, other consumer electronic devices or other data processing systems. In particular, the operations described are digital signal processing operations performed by a processor that is executing instructions stored in one or more memories. The processor may read the stored instructions from the memories and execute the instructions to perform the operations described. These memories represent examples of machine readable non-transitory storage media that can store or contain computer program instructions which when executed cause a data processing system to perform the one or more methods described herein. The processor may be a processor in a local device such as a smartphone, a processor in a remote server, or a distributed processing system of multiple processors in the local device and remote server with their respective memories containing various parts of the instructions needed to perform the operations described.

While certain exemplary instances have been described and shown in the accompanying drawings, it is to be understood that these are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method of accessing a wireless communication network by a device of a first device type, the method comprising:
   receiving, by the device from a base station of the wireless communication network targeted to operate with a second device type, an indication of whether the first device type is allowed to access the wireless communication network, the first device type having less capabilities than the second device type;
   in response to receiving the indication showing that the first device type is allowed to access the wireless communication network, transmitting, by the device to the base station, signaling associated with connecting to the base station using resources reserved for the first device type which identifies, to the wireless communication network, that the device belongs to the first device type;
   receiving, by the device, an inquiry from the base station about capabilities of the device; and
   transmitting, by the device to the base station, capability information of the device.

2. The method of claim 1, wherein transmitting, by the device to the base station, signaling associated with connecting to the base station comprises transmitting the signaling using resources reserved for the first device type to enable the device to identify itself as belonging to the first device type to the base station.

3. The method of claim 1, wherein the capability information of the device transmitted to the base station comprises one or more of operating parameters, synchronization monitoring resources, processing latencies, supported modulation schemes, half-duplex frequency division duplex configurations of the device.

4. The method of claim 3, wherein the operating parameters comprise a maximum transport block size of one or more messages supported by the device to receive resource allocation information from the base station.

5. The method of claim 3, wherein the synchronization monitoring resources comprise information on resources used by the device to monitor a control message received from the base station.

6. The method of claim 3, wherein the processing latencies comprise one or more of a first processing time associated with decoding downlink data received from the base station or a second processing time associated with preparing uplink data for transmission to the base station.

7. The method of claim 3, wherein the half-duplex frequency division duplex configurations comprise a first guard period when the device switches from a downlink reception to an uplink transmission and a second guard period when the device switches from an uplink transmission to a downlink reception.

8. The method of claim 1, further comprising the device prioritizing among a plurality of types of uplink transmissions and downlink receptions in response to a scheduling conflict between the uplink transmissions and downlink receptions.

9. An apparatus of a first apparatus type, comprising: a memory configured to store instructions; and
   at least one processor configured to execute the instructions stored in the memory to perform operations that comprise:
   receive from a base station targeted to operate with a second apparatus type an indication of whether the first apparatus type is allowed to access the base station, the first apparatus type having less capabilities than the second apparatus type;
   in response to receiving the indication showing that the first device type is allowed to access the base station, transmit signaling to the base station to connect to the base station using resources reserved for the first device type which identifies, to the base station, that the device belongs to the first device type;
   receive an inquiry from the base station to provide information about capabilities of the apparatus; and
   transmit to the base station capability information of the apparatus.

10. The apparatus of claim 9, wherein the at least one processor configured to transmit signaling to the base station to connect to the base station comprises the processor configured to transmit the signaling using resources reserved for the first apparatus type to enable the apparatus to identify itself as belonging to the first apparatus type to the base station.

11. The apparatus of claim 9, wherein the capability information of the apparatus transmitted to the base station comprises one or more of operating parameters, synchronization monitoring resources, processing latencies, supported modulation schemes, half-duplex frequency division duplex configurations of the apparatus.

12. The apparatus of claim 11, wherein the operating parameters comprise a maximum transport block size of one or more messages supported by the apparatus to receive resource allocation information from the base station.

13. The apparatus of claim 11, wherein the synchronization monitoring resources comprise information on resources used by the apparatus to monitor a control message received from the base station.

14. The apparatus of claim 11, wherein the processing latencies comprise one or more of a first processing time associated with decoding downlink data received from the base station or a second processing time associated with preparing uplink data for transmission to the base station.

15. The apparatus of claim 11, wherein the half-duplex frequency division duplex configurations comprise a first guard period when the apparatus switches from a downlink reception to an uplink transmission and a second guard period when the apparatus switches from an uplink transmission to a downlink reception.

16. The apparatus of claim 15, wherein the first guard period and the second guard period are configured based on a distance between the apparatus and the base station.

17. The apparatus of claim 9, wherein the operations further comprise prioritize among a plurality of types of uplink transmissions and downlink receptions in response to a scheduling conflict between the uplink transmissions and downlink receptions.

18. A method of communication by a base station of a wireless communication network, the method comprising:
   broadcasting, by the base station, an indication of whether a first device type is allowed to access the wireless communication network, wherein the wireless communication network is targeted to operate with a second device type, the first device type having less capabilities than the second device type;

receiving, by the base station from a device of the first device type, signaling to connect to the base station through resources reserved for the first device type which identifies, to the wireless communication network, that the device belongs to the first device type, wherein the signaling is performed in response to the indication that the first device type is allowed to access the wireless communication network;

transmitting, by the base station to the device, an inquiry about capabilities of the device; and receiving, by the base station from the device, capability information of the device.

19. The method of claim 18, wherein receiving, by the base station from the device, signaling to connect to the base station comprises receiving the signaling using resources reserved for the first device type to enable the device to identify itself as belonging to the first device type to the base station.

20. The method of claim 18, wherein the capability information of the device received by the base station comprises one or more of operating parameters, synchronization monitoring resources, processing latencies, supported modulation schemes, half-duplex frequency division duplex configurations of the device.

* * * * *

UNITED STATES PATENT AND TRADEMARK OFFICE
CERTIFICATE OF CORRECTION

| | |
|---|---|
| PATENT NO. | : 12,035,418 B2 |
| APPLICATION NO. | : 17/598205 |
| DATED | : July 9, 2024 |
| INVENTOR(S) | : Hong He et al. |

Page 1 of 1

It is certified that error appears in the above-identified patent and that said Letters Patent is hereby corrected as shown below:

On the Title Page

In Column 1, item (22), PCT Filed, please delete "Feb. 2, 2020" and insert --Feb. 12, 2020--.

Signed and Sealed this
Fourth Day of November, 2025

John A. Squires
*Director of the United States Patent and Trademark Office*